(12) United States Patent
Valdes Garcia et al.

(10) Patent No.: US 10,009,202 B1
(45) Date of Patent: Jun. 26, 2018

(54) DIRECT RF DEMODULATION

(71) Applicant: International Business Machines Corporation, Armonk, NY (US)

(72) Inventors: Alberto Valdes Garcia, Chappaqua, NY (US); Wayne H. Woods, Jr., Burlington, MA (US); Bodhisatwa Sadhu, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/675,887

(22) Filed: Aug. 14, 2017

(51) Int. Cl.
*H03D 3/00* (2006.01)
*H04L 27/22* (2006.01)

(52) U.S. Cl.
CPC .................. *H04L 27/22* (2013.01)

(58) Field of Classification Search
CPC ............. H04L 27/22; H04L 2027/0026; H04L 2027/0028; H04L 2027/003; H04L 2027/0032; H03D 3/009; H04N 21/4382
USPC ........................................................ 375/329
See application file for complete search history.

(56) References Cited

U.S. PATENT DOCUMENTS

| | | | |
|---|---|---|---|
| 6,704,344 B1 | 3/2004 | Hu et al. | |
| 6,831,942 B2 | 12/2004 | Guo et al. | |
| 7,061,997 B1 | 6/2006 | Eberlein et al. | |
| 7,756,001 B2 | 7/2010 | Park et al. | |
| 7,773,697 B2 | 8/2010 | Dibiaso et al. | |
| 8,789,003 B1 | 7/2014 | Ding et al. | |
| 9,419,834 B2 | 8/2016 | Nam | |
| 9,641,368 B2* | 5/2017 | Liu | H04L 27/22 |
| 2007/0030924 A1 | 2/2007 | Yu | |
| 2014/0312986 A1 | 10/2014 | Edelstein et al. | |
| 2014/0315500 A1 | 10/2014 | Ding et al. | |

FOREIGN PATENT DOCUMENTS

| | | | |
|---|---|---|---|
| JP | 2000101663 A | 4/2000 | |
| JP | 3801513 B2 | 7/2006 | |

OTHER PUBLICATIONS

Tousi et al., "A Ka-band Digitally-Controlled Phase Shifter with sub-degree Phase Precision", 2016 IEEE Radio Frequency Integrated Circuits Symposium, © 2016 IEEE, 4 pages.
Woods et al., "CMOS Millimeter Wave Phase Shifter Based on Tunable Transmission Lines", IBM Semiconductor Research and Development, Essex Junction, VT, © 2013 IEEE, 4 pages.

* cited by examiner

*Primary Examiner* — Kevin Kim
(74) *Attorney, Agent, or Firm* — Steven F. McDaniel

(57) ABSTRACT

An apparatus for decoding a data modulated signal includes a signal receiver that receives a data modulated signal that is encoded with phase-shift keying (PSK) and provides an amplified signal corresponding to the data modulated signal, a tunable phase shifter that receives a local reference signal and a selected phase shift, applies the selected phase shift to the local reference signal to produce a phase shifted reference signal, a summing unit that sums the amplified signal and the phase shifted reference signal to produce a summed signal, an amplitude detector that determines an amplitude of the summed signal, and a symbol detector that varies the selected phase shift and determines a current symbol within the data modulated signal based on the amplitude of the summed signal as the selected phase shift is varied. A corresponding method is also disclosed herein.

20 Claims, 4 Drawing Sheets

DIRECT RF DEMODULATION

GOVERNMENT RIGHTS

This invention was made with government support under contract number FA8650-09-C-7924 awarded by the United States Department of Defense. The United States Government has certain rights to this invention.

BACKGROUND OF THE INVENTION

The present invention relates generally to RF circuits and methods, and more particularly to demodulation circuits and methods.

RF receivers typically rely on down-conversion in the analog/RF domain and demodulation in the digital domain. This provides flexibility and sensitivity but comes at the cost of complexity and power. Direct RF demodulators without mixers or ADCs exist, but only for simple modulations such as on-off-keying (OOK) and frequency-shift-keying (FSK).

SUMMARY

An apparatus for decoding a data modulated signal includes a signal receiver configured to receive a data modulated signal that is encoded with phase-shift keying (PSK) and provide an amplified signal corresponding to the data modulated signal, a tunable phase shifter configured to receive a local reference signal and a selected phase shift of a plurality of selectable phase shifts, apply the selected phase shift to the local reference signal to produce a phase shifted reference signal corresponding to the local reference signal, a summing unit configured to sum the amplified signal and the phase shifted reference signal to produce a summed signal, an amplitude detector configured to determine an amplitude of the summed signal, and a symbol detector configured to vary the selected phase shift and determine a current symbol within the data modulated signal based on the amplitude of the summed signal as the selected phase shift is varied. A corresponding method is also disclosed herein.

DETAILED DESCRIPTION

At least some of the embodiments disclosed herein recognize that direct RF demodulators offer advantages over conventional demodulation approaches. For example, conventional receiver systems typically comprise mixers, ADCs and demodulators that may limit the data-rate and increase the complexity and power requirements of a receiving unit. Furthermore, at least some of the embodiments disclosed herein recognize that the frequency down-converters (mixers) and demodulators used in conventional receiver systems may be replaced with a tunable phase shifter, a summing unit such as a Wilkinson power combiner, and an amplitude detector.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following drawings, description and appended claims, or may be learned by the practice of the invention as set forth hereinafter.

Figure 1A:
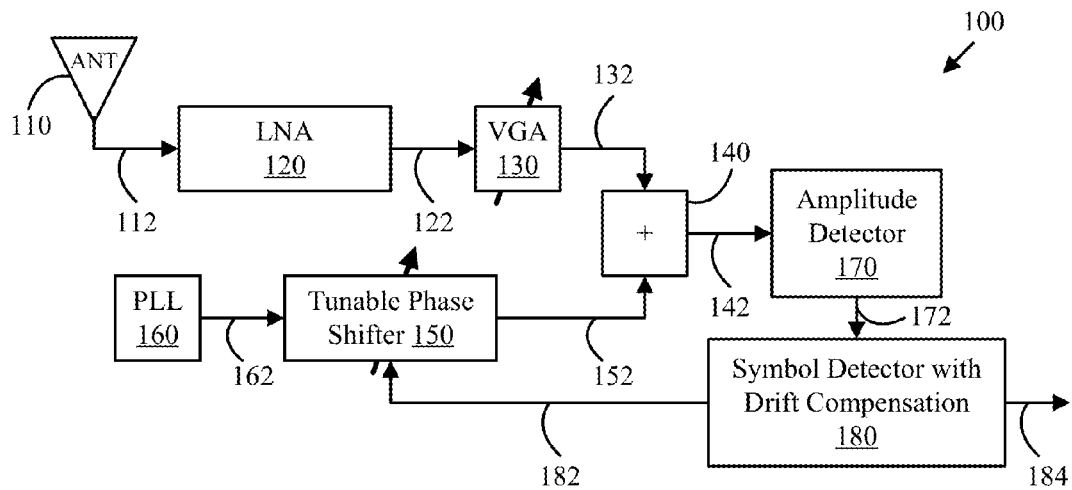
FIG. 1A is a schematic block diagram depicting one example of a data receiver in accordance with at least one embodiment of the present invention.

FIG. 1A is a schematic block diagram depicting one example of a data receiver 100 in accordance with at least one embodiment of the present invention. As depicted, the data receiver 100 includes an antenna 110, a low-noise amplifier (LNA) 120, a variable gain amplifier (VGA) 130, a summing unit 140, a tunable phase shifter 150, a reference signal generator 160, an amplitude detector 170, and a symbol detector 180. The data receiver 100 facilitates the direct decoding of data encoded on an RF signal.

The antenna 110 receives a data modulated signal which is provided as a received signal 112 to the LNA 120. In some embodiments, the data modulated signal is encoded with phase-shift keying (PSK) and the received signal is a received PSK signal. The LNA 120 amplifies the received signal 112 and thereby produces a boosted signal 122. The variable gain amplifier (VGA) 130 further amplifies the boosted signal 122 to produce an amplified signal 132, or comparable amplitude to the phase shifter output. The antenna 110, LNA 120, and VGA 130 or similar configurations may be collectively referred to as a signal receiver.

The summing unit 140 sums the amplified signal 132 with a phase shifted reference signal 152 to produce a summed signal 142. The summing unit 140 may sum signals 132 and 152 while maintaining electrical isolation between the two signals. In some embodiments, the summing unit 140 is a Wilkinson power combiner.

The tunable phase shifter 150 shifts a local reference signal 162 as indicated by a selected phase shift 182 to produce the phase shifted reference signal 152. The selected phase shift 182 may be an analog signal, a digital index or some other indicator. The tunable phase shifter 150 preferably has a very quick response to changes in the selected phase shift 182 relative to the symbol rate of the modulated carrier. Furthermore, a substantially constant loss or gain over the operating bandwidth and phase shift range is preferable. In one embodiment subsequently described in FIGS. 3 and 4, the tunable phase shifter 150 has a settling time of less than 6 nanoseconds in response to a change in the selected phase shift 182 and a variation in loss or gain of less than 1 dB over a phase shift operating range of 360 degrees.

The reference signal generator 160 generates the local reference signal 162. In the depicted embodiment, the reference signal generator 160 comprises a phase locked loop. The amplitude detector 170 determines the amplitude of the summed signal 142 over a selected interval such as one or more carrier periods and provides the detected amplitude 172. The detected amplitude 172 may be determined in response to each change in the selected phase shift 182. In some embodiments, the amplitude detector 170 comprises an (analog or digital) integrator.

One of skill in the art will appreciate the insight that the average amplitude of the summed signal 142 will be minimized when the phase shifted reference signal 152 is 180 degrees out of phase with the amplified signal 132 (and maximized when the phase shifted reference signal 152 is in-phase with the amplified signal 132). Furthermore, the summed signal 142 will approach zero when the amplitude of the amplified signal 132 and the phase shifted reference signal 152 are substantially equal and 180 degrees out of phase. Consequently, the amplitude detector 170 and tunable phase shifter 150 may be leveraged by the symbol detector 180 to detect the phase of the current symbol (transmitted to the data receiver 100).

The symbol detector 180 varies the selected phase shift and determines a current symbol within the data modulated signal based on the amplitude of the summed signal as the selected phase shift is varied. In some embodiments, the symbol detector 180 accumulates or tracks errors between detected phase shifts and ideal valid phase shifts and uses the accumulated or tracked error to improve frequency locking and symbol detection. For example, due to minor reference frequency mismatches or phase noise generated by local oscillators at the transmitter or the data receiver 100, the phase of transmitted signal carrier may drift with respect to the data receiver 100. By accumulating or tracking phase shift errors, symbol sampling can be adjusted (e.g., by advancing or slipping super-rate clock cycles) to compensate for such frequency mismatches and drifting.

Figure 1B:
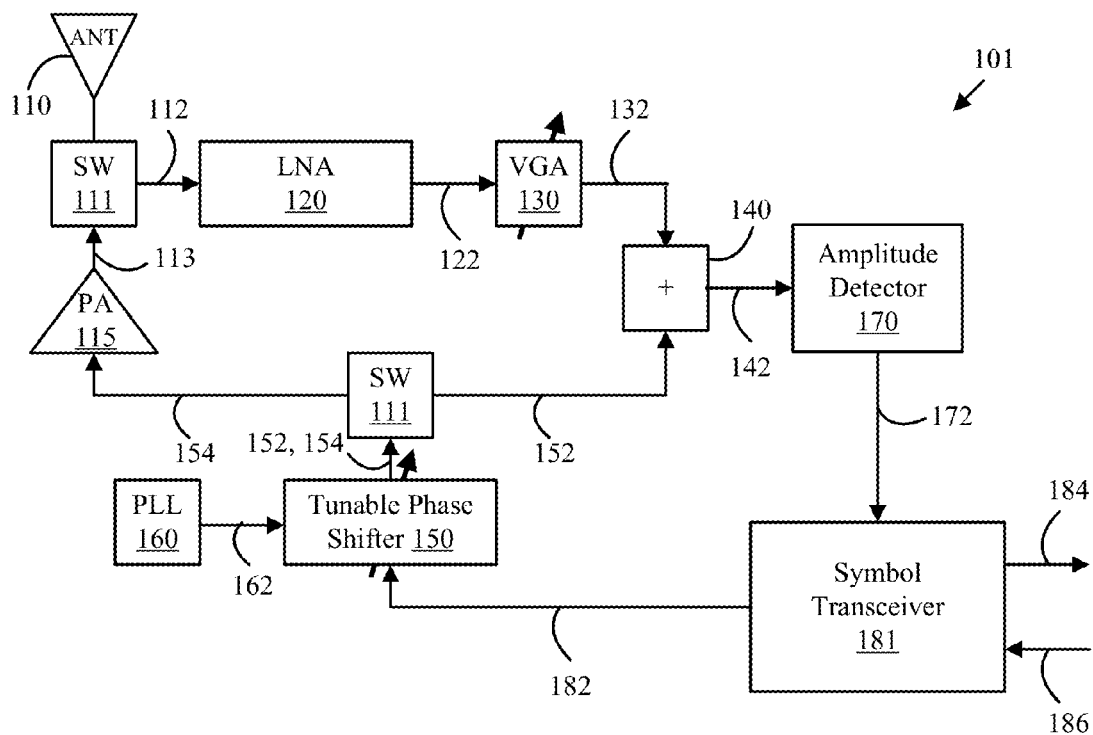
FIG. 1B is a schematic block diagram depicting one example of a data transceiver in accordance with at least one embodiment of the present invention.

FIG. 1B is a schematic block diagram depicting one example of a data transceiver 101 in accordance with at least one embodiment of the present invention. In addition to the elements included in the data receiver 100, the data transceiver 101 includes mode switches 111, a power amplifier 115 and a symbol transceiver 181 instead of the symbol detector 180. The data transceiver 101 may transmit or receive data using the tunable phase shifter 150. The depicted data transceiver 101 is a half-duplex device. However, one of skill in the art will appreciate that the principles conveyed herein may also be used to provide a full-duplex version (e.g., via multiple tunable phase shifters 150).

In addition to determining the received symbol 184 via the tunable phase shifter 150, the symbol transceiver 181 may adjust the tunable phase shifter 150 to encode a transmitted symbol 186 onto a transmission signal 154 provided by the symbol transceiver 181. A power amplifier 115 may amplify the transmission signal 154 and provide an amplified signal 113. When in a transmission mode, the mode switches 111 connect the amplified signal to the antenna 110 and the output of the tunable phase shifter 150 to the power amplifier 115. When in a receive mode, the mode switches 111 connect the antenna 110 to the LNA 120 and the output of the tunable phase shifter 150 to the summing unit 140.

Figure 2:
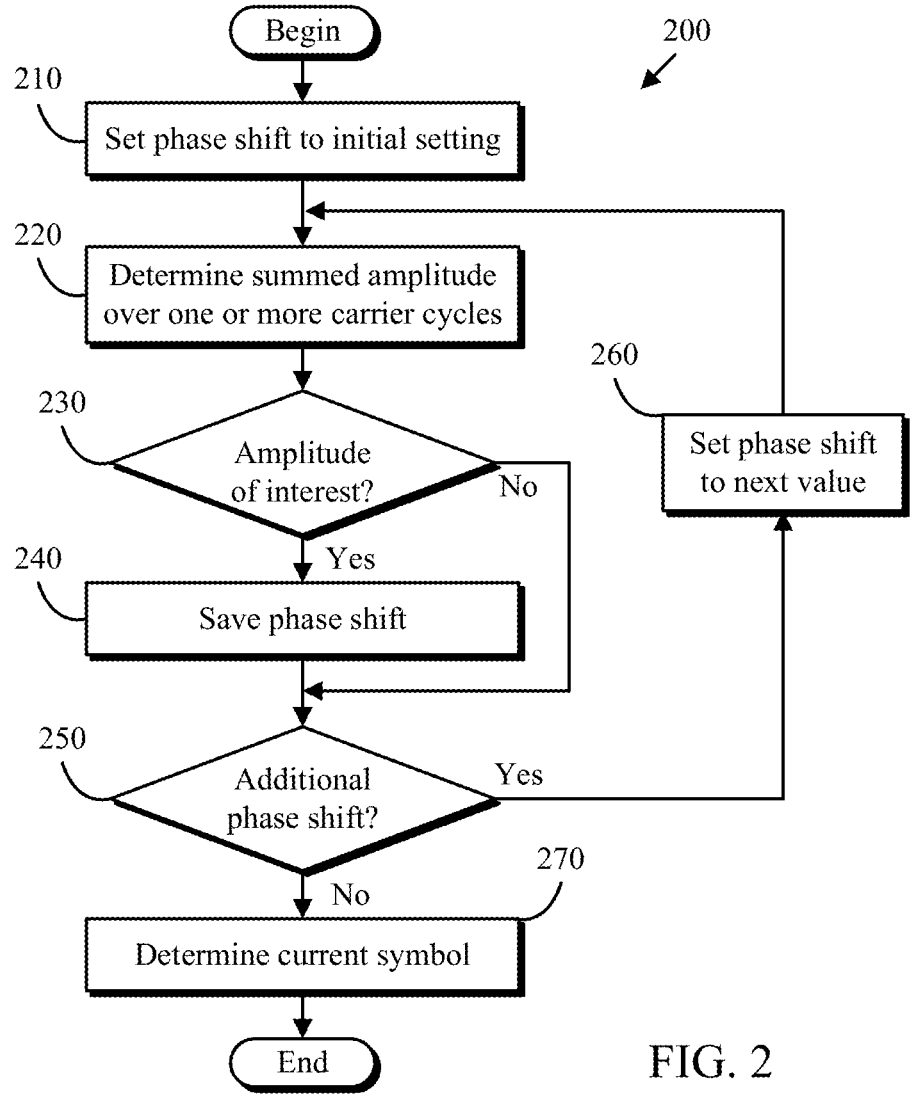
FIG. 2 is a flowchart depicting one example of a symbol detection method in accordance with at least one embodiment of the present invention.

FIG. 2 is a flowchart depicting one example of a symbol detection method 200 in accordance with at least one embodiment of the present invention. As depicted, the symbol detection method 200 includes setting (210) a phase shift to an initial setting, determining (220) a summing amplitude, determining (230) whether the summing amplitude is an amplitude of interest, saving (240) the current phase shift, determining (250) whether additional phase shifts need to be checked, setting (260) the phase shift to the next value, and determining (270) the current symbol. Essentially, the symbol detection method 200 varies the phase shift setting and determines a current symbol within the data modulated signal based on the amplitude of the summed signal as the selected phase shift is varied. The symbol detection method 200 may be conducted by the data receiver 100 or the data transceiver 101 in general and the symbol detector 180 or the symbol transceiver 181 in particular.

Setting (210) a phase shift to an initial setting may include setting the phase shift of the tunable phase shifter 150 to a selected value such as a minimum or maximum value. In some embodiments, setting the phase shift comprises writing to a control register for the tunable phase shifter 150.

Determining (220) a summing amplitude may include integrating the output of the summing unit 140 over one or more (PLL derived) carrier cycles. For example, in one embodiment an integration capacitor (not shown) associated with the amplitude detector 170 is used to integrate the summed signal 142. The integration capacitor may be discharged previous to, or commencing with, integration of the summed signal 142. The amplitude of the integration capacitor may be converted to a digital amplitude via an A/D convertor or the like. Converting to the digital domain facilitates digital processing and control by the symbol detector 180.

Determining (230) whether the summed amplitude is an amplitude of interest may include comparing the detected amplitude with the (previous) smallest and/or largest detected amplitude. If the summed amplitude is the smallest or largest encountered amplitude, the summed amplitude may be stored as an amplitude of interest and the depicted method proceeds by saving (240) the current phase shift. In a particularly robust embodiment of the method 200, amplitude patterns are used for symbol detection and every amplitude is considered an amplitude of interest.

Saving (240) the current phase shift may include storing the phase shift (index) corresponding to an amplitude of interest as a detected phase shift (index) for the current symbol. In one embodiment, a sequence of detected phase shifts is stored in an array to facilitate symbol detection and drift compensation. In one embodiment, the array is used as a circular buffer and the oldest t entry in the array may be overwritten by the saving operation 240.

Determining (250) whether additional phase shifts need to be checked may include comparing the current phase shift with a minimum or maximum value. If additional phase shifts need to be checked, the method proceeds by setting (260) the phase shift to the next value. If no additional phase shifts need to be checked, the method advances by determining (270) the current symbol.

Setting (260) the phase shift may include incrementing or decrementing the phase shift index to the next value. In some embodiments, all possible phase shifts are tried in succession. For example, for N-ary phase shift keying, at least N phase shifts (and preferably at least 2·N phase shift values) are tested by the symbol detection method 200. In other embodiments, a minimization seeking approach such as simulated annealing is used to continually track the minimum phase shift at a rate that is higher than the symbol rate (e.g., 2·N·R where R is the symbol rate and N is the number of possible symbols).

Determining (270) the current symbol may include determining a current symbol within the data modulated signal based on how the amplitude of the summed signal varies as the phase shift index is varied. In some embodiments, the amplitude pattern is used to determine the current symbol. In other embodiments, the detected phase shift index corresponding to the smallest or largest amplitude summed signal is used to determine the current symbol. For a largest amplitude summed signal, the corresponding phase shift index may be assumed to be substantially in phase with the phase of the transmitted and received symbol. For a smallest amplitude summed signal, the corresponding phase shift index may be assumed to be substantially 180 degrees out of phase with the phase of the transmitted and received symbol.

The symbol detection method 200 may be conducted for each detected symbol. In some embodiments, the VGA 130 is used to periodically adjust the gain on the boosted signal 122 in order to match the amplitude of the amplified signal 132 with the phase shifted reference signal 152 (e.g., within 1 dB). For example, after the phase shift corresponding to the smallest detected amplitude is determined for a symbol, the gain provided by the VGA 130 may be adjusted to further minimize the summed signal 142. Alternatively, the communication protocol used in conjunction with the method 200 could include a preamble, with a known series of symbols, during which the VGA 130 could be adjusted before actual data is received.

One of skill in the art will appreciate the flexibility provided by the method 200. In some embodiments, a synchronization cycle between the transmitter and the data receiver 100 is conducted periodically and/or initially previous to execution of the symbol detection method 200. In certain embodiments, the gain on the VGA 130 is only adjusted during such a synchronization cycle.

In one particular embodiment, the method 200 essentially conducts the following steps:
1. Set the phase shifter to setting 1.
2. Record the detected amplitude.
3. Increment phase setting by 1.
4. Repeat steps 2 and 3 until all N phase settings have been tested. The best estimate for the data symbol phase is the phase of the setting for which the detected amplitude is minimum+180 degrees.

To enable carrier tracking, the symbol detection method 200 can identify whether the detected symbol is shifting progressively from the expected positions. For instance, in the case of QPSK, 0, 90, 180 and 270 degree symbols are expected (in any sequence) and if the algorithm detects 0, 182, 94, 276, 8, 100 etc. it means that there's a slow positive carrier phase progression which can be compensated for. The above scenario assumes that the number of possible phase shifter settings is equal to or larger than the number of possible symbol phases N and furthermore that the time that it takes to test all possible phase states is less than or equal to the symbol time.

In one particularly robust embodiment of the symbol detection method 200, the tunable phase shifter 150 is swept over the entire range of possible phases and the set of amplitude values provided by the amplitude detector 170 is compared against various reference sets (or otherwise processed) to determine the phase of the currently received symbol. Alternately, the set of amplitude values provided by the amplitude detector 170 may be used to estimate the phase of the currently received symbol via polynomial fitting or the like.

One of skill in the art will appreciate that the means and methods disclosed herein enable relatively complex data demodulation using simpler receiver circuitry than previous approaches. One of skill in the art will also appreciate that many variations of the disclosed embodiments, as well as other embodiments, may be implemented that fit within the scope of the claimed invention.

Figure 3:
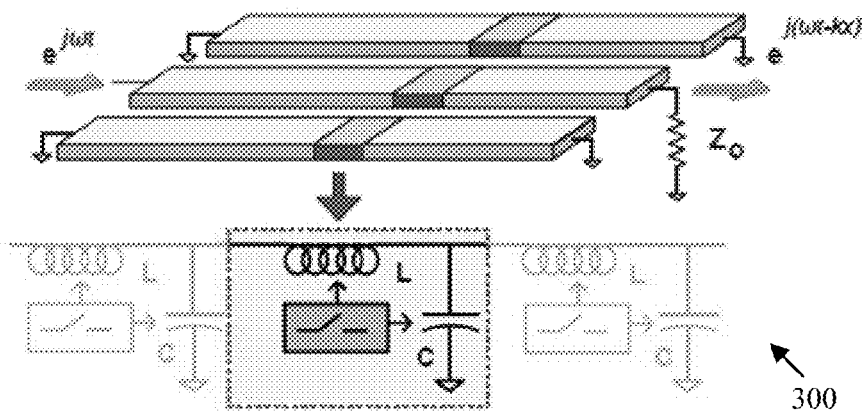
FIG. 3 is schematic diagram of one example of a tunable phase shifter in accordance with at least one embodiment of the present invention.
Figure 4:
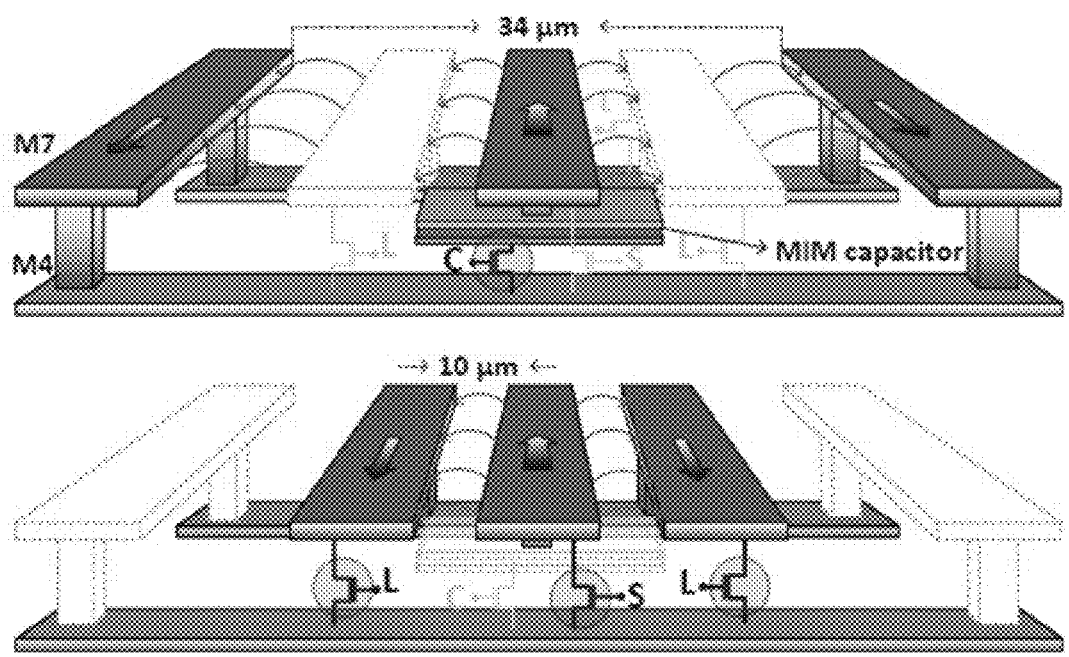
FIG. 4 is hybrid layout and schematic diagram of one example of a tunable phase shifter in accordance with at least one embodiment of the present invention.

FIGS. 3 and 4 depict one example of a tunable phase shifter that is suitable for use as the tunable phase shifter 150. While FIGS. 3 and 4 depict one such example, other embodiments may be known to those of skill in the art.

The delay of a transmission line is the product of the physical length and the wavenumber. For an integrated tunable transmission line with a fixed length, we can change the phase shift by tuning the wavenumber of the transmission line. As shown in FIG. 3, a slow-wave artificial transmission line may be constructed that enables controlling the propagation velocity of the signal by changing the values of the equivalent inductors and capacitors in each section. Such an artificial transmission line is a good approximation to the dispersion-free transmission line transfer function as long as the resulting delay from each unit cell is small compared to the period of the highest frequency of interest. Consequently, the smaller the inductor and capacitors are in the unit section, the more nearly the artificial transmission line approximates an ideal wide-band phase shifter.

A common limiting factor in the accuracy of the depicted switch-based phase shifter is the change in the characteristic impedance that results from switching between different modes of operation. When a large phase shift per section is used, the phase properties are essentially those of a lumped circuit. As a result, dispersion effects limit the phase linearity and overall phase and amplitude accuracy.

By ensuring a small phase shift per unit, the phase shifter behaves closer to a true transmission line with a distributed structure. By ensuring that the switching between two delay modes in each cell maintains a selected fixed ratio between the effective inductance and capacitance of the cell, a fixed characteristic impedance may be achieved. This results in a structure with minimal inter-block reflections and a maximally linear phase tuning.

FIG. 4 shows that each unit cell includes a coplanar waveguide with a shunt capacitor to ground. The coplanar waveguide is comprised of two sets of parallel groundlines, one set is close to the signal line while the other set is farther apart. The outer parallel lines are directly connected to ground, while the inner lines are grounded through a pair of NMOS switches. The purpose of the NMOS switches is to control the value of the effective inductance in the cell.

The value of an inductor is a function of the area encompassing its magnetic field. When the depicted 'L' switches are open and the depicted 'C' switch is closed as shown in the top portion of FIG. 4, the intermediate lines have no current flow and as a result do not shield the magnetic field produced by the current flowing in the signal line. Hence, the effective inductance is determined by the area between the signal line and the outer ground lines. On the other hand, when the depicted 'L' switches are on and the depicted 'C' switch is open as shown in the lower portion of FIG. 4, the intermediate lines shield the magnetic field. As a result, the inductance is determined by the smaller area between the signal line and the middle lines. In other words, the ground shields act as inductors that are coupled to the inductance of the signal line. By switching between the two different lines, the mutual inductance between the ground and signal line is effectively controlled, altering the overall inductance seen across the unit cell.

For ideal phase characteristics, switching should only change the delay without altering the characteristic impedance Zo. To achieve this, the shunt capacitance in the unit cell switches concurrent to any change in the unit inductance. When the inductance is decreased by switching in the inner lines, the capacitor is switched out to decrease the capacitance. In this way, proper design of the capacitance size ensures that the ratio between the inductance and capacitance are maintained in the two delay modes, minimizing any change in Zo.

The distance between the ground and signal lines as well as the capacitance and switch sizes are determined based on EM simulation of the unit cell. The structure is optimized to maintain the uniform impedance, while maximizing the difference between the delay ($\sqrt{LC}$) in the two modes of operation. This is achieved by maximizing the relative change in the inductance ($\Delta L/L$) and the capacitance ($\Delta C/C$), ensuring the largest change in their product, i.e. the relative change in the delay per unit cell.

Beside minimal dispersion in phase, constant amplitude is necessary for consistency in the overall gain of the front-end. However, during the process of switching between different delay modes, loss characteristics of the line inevitably changes. This is because the loss introduced by the switches operating in the two modes are different. In this particular design, simulations indicate that the C-switch in the high-delay mode introduces a slightly higher loss compared to the L-switch in the low-delay mode. Such loss imbalance when accumulated across the entire transmission line can result in few dBs of loss variation between the two extreme delay settings. To counter this imbalance we introduce a balancing S-switch parallel to the signal line as shown in FIG. 4. This extra switch is turned on in the low-delay mode acting as a shunt resistor in the signal line, thus increasing the loss. By appropriately sizing this switch we achieve balanced loss in the two modes which results in minimum amplitude variation between different delay settings.

If the simulated phase change from a unit cell is, for example, around 5 degrees, a phase shifter could employ approximately 40 cascaded unit cells to achieve at least 180 degrees of phase shift. To complete the required 360 degrees, an additional 180 degree step could be implemented with the same method or through known techniques for phase inversion (equivalent to 180 degree phase shift). In principle, the phase control resolution is limited by the size of the unit cell and can be further reduced using a finer unit cell. In the embodiment depicted in FIG. 4, each unit cell has 3 bits named an L-bit, C-bit, and S-bit which control the value of the inductor, capacitor, and loss, respectively. All of the bits in the cells (e.g., 40 cells with 3 bits each) could be controlled by a digital decoder through a serial interface.

Figure 5:
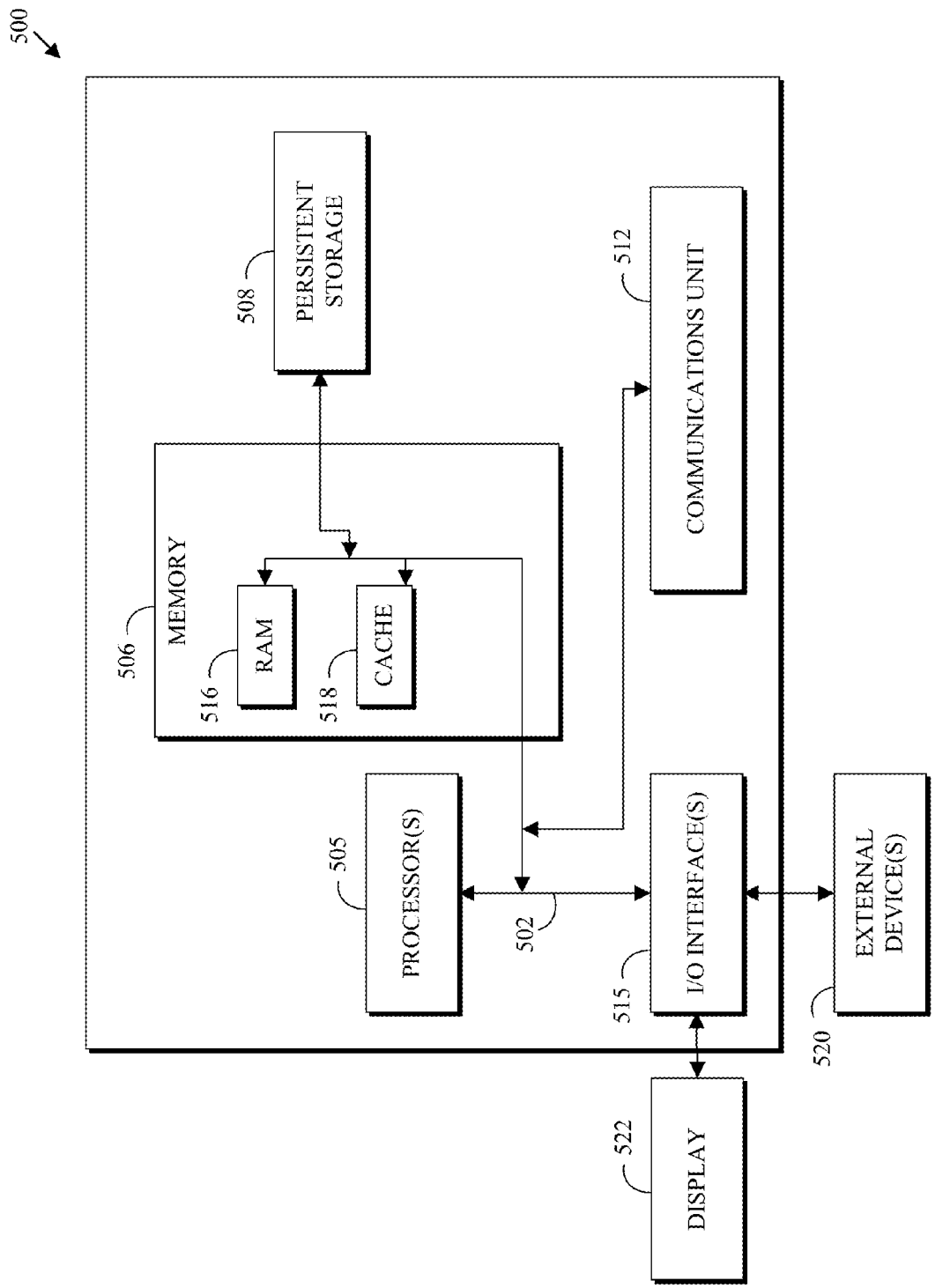
FIG. 5 is a block diagram depicting one example of a computing apparatus suitable for executing one or more of the methods disclosed herein.

FIG. 5 is a block diagram depicting one example of a computing apparatus (i.e., computer 500) suitable for executing one or more of the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for decoding a data modulated signal, the apparatus comprising:
   a signal receiver configured to receive a data modulated signal that is encoded with phase-shift keying (PSK) and provide an amplified signal corresponding to the data modulated signal;
   a tunable phase shifter configured to receive a local reference signal and a selected phase shift of a plurality of selectable phase shifts, apply the selected phase shift to the local reference signal to produce a phase shifted reference signal corresponding to the local reference signal;
   a summing unit configured to sum the amplified signal and the phase shifted reference signal to produce a summed signal;
   an amplitude detector configured to determine an amplitude of the summed signal; and
   a symbol detector configured to vary the selected phase shift and determine a current symbol within the data modulated signal based on the amplitude of the summed signal as the selected phase shift is varied.

2. The apparatus of claim 1, wherein the tunable phase shifter is a tunable transmission line.

3. The apparatus of claim 1, wherein the summing unit is a Wilkinson power combiner.

4. The apparatus of claim 1, wherein the symbol detector is further configured to determine a phase drift between the amplified signal and the phase shifted reference signal.

5. The apparatus of claim 4, wherein the phase drift is determined by accumulating a difference between the phase shift setting and an expected phase shift over a selected interval.

6. The apparatus of claim 1, wherein the tunable phase shifter has a variation in loss or gain of less than 1 dB over a phase shift operating range of 360 degrees.

7. The apparatus of claim 1, wherein the tunable phase shifter has a settling time of less than 6 nanoseconds in response to a change in the selected phase shift.

8. The apparatus of claim 1, wherein the receiver comprises an low-noise amplifier (LNA) followed by a variable gain amplifier (VGA).

9. The apparatus of claim 8, wherein a gain of the VGA is selected to match an amplitude of the amplified signal to within 1 dB of an amplitude of the phase shifted reference signal.

10. The apparatus of claim 1, wherein the data modulated signal corresponds to N-ary PSK and the tunable phase shifter supports at least 2·N phase shift settings.

11. A method for decoding a data modulated signal, the method comprising:
    providing a signal receiver configured to receive a data modulated signal that is encoded with phase-shift keying (PSK) and provide an amplified signal corresponding to the data modulated signal;
    providing a tunable phase shifter configured to receive a local reference signal and a selected phase shift of a plurality of selectable phase shifts, apply the selected phase shift to the local reference signal to produce a phase shifted reference signal corresponding to the local reference signal;
    providing a summing unit configured to sum the amplified signal and the phase shifted reference signal to produce a summed signal;
    providing an amplitude detector configured to determine an amplitude of the summed signal;
    providing a symbol detector configured to vary the selected phase shift and determine a current symbol within the data modulated signal based on the amplitude of the summed signal as the selected phase shift is varied; and
    detecting the current symbol within the amplified from the phase shift setting that minimizes the amplitude of the summed signal over one or more carrier cycles.

12. The method of claim 11, wherein the tunable phase shifter is a tunable transmission line.

13. The method of claim 11, wherein the summing unit is a Wilkinson power combiner.

14. The method of claim 11, wherein the symbol detector is further configured to determine a phase drift between the amplified signal and the phase shifted reference signal.

15. The method of claim 14, wherein the phase drift is determined by accumulating a difference between the phase shift setting and an expected phase shift over a selected interval.

16. The method of claim 11, wherein the tunable phase shifter has a variation in loss or gain of less than 1 dB over a phase shift operating range of 360 degrees.

17. The method of claim 11, wherein the tunable phase shifter has a settling time of less than 6 nanoseconds in response to a change in the selected phase shift.

18. The method of claim 11, wherein the receiver comprises an low-noise amplifier (LNA) followed by a variable gain amplifier (VGA) and wherein a gain of the VGA is selected to match an amplitude of the amplified signal to within 1 dB of an amplitude of the phase shifted reference signal.

19. The method of claim 11, wherein the data modulated signal corresponds to N-ary PSK and the tunable phase shifter supports at least 2·N phase shift settings.

20. An apparatus for decoding a data modulated signal, the apparatus comprising:
    a signal receiver configured to receive a data modulated signal that is encoded with phase-shift keying (PSK) and provide an amplified signal corresponding to the data modulated signal;
    a tunable phase shifter configured to receive a local reference signal and a selected phase shift of a plurality of selectable phase shifts, apply the selected phase shift to the local reference signal to produce a phase shifted reference signal corresponding to the local reference signal;
    a summing unit configured to sum the amplified signal and the phase shifted reference signal to produce a summed signal;

an amplitude detector configured to determine an amplitude of the summed signal;
a symbol detector configured to vary the selected phase shift and determine a current symbol within the data modulated signal based on the amplitude of the summed signal as the selected phase shift is varied;
wherein the tunable phase shifter is a tunable transmission line;
wherein the summing unit is a Wilkinson power combiner;
wherein the symbol detector is further configured to determine a phase drift between the amplified signal and the phase shifted reference signal; and
wherein the phase drift is determined by accumulating a difference between the selected phase shift and an expected phase shift over a selected interval.

* * * * *